United States Patent
Liu et al.

(10) Patent No.: US 11,408,634 B2
(45) Date of Patent: Aug. 9, 2022

(54) CONTROL METHOD AND DEVICE FOR CONTROLLING AIR CONDITIONING UNIT, AND AIR CONDITIONING UNIT

(71) Applicant: Gree Electric Appliances, Inc. of Zhuhai, Guangdong (CN)

(72) Inventors: Hua Liu, Guangdong (CN); Mingsheng Zhuo, Guangdong (CN); Qi Cheng, Guangdong (CN); Peisheng Chen, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 14 days.

(21) Appl. No.: 16/961,728

(22) PCT Filed: Dec. 14, 2018

(86) PCT No.: PCT/CN2018/121247
§ 371 (c)(1),
(2) Date: Jul. 13, 2020

(87) PCT Pub. No.: WO2019/153888
PCT Pub. Date: Aug. 15, 2019

(65) Prior Publication Data
US 2021/0063045 A1 Mar. 4, 2021

(30) Foreign Application Priority Data
Feb. 11, 2018 (CN) .......................... 201810141010.5

(51) Int. Cl.
F24F 11/89 (2018.01)
F24F 11/74 (2018.01)
(Continued)

(52) U.S. Cl.
CPC .............. *F24F 11/89* (2018.01); *F24F 11/74* (2018.01); *F24F 11/86* (2018.01); *G05B 13/024* (2013.01);
(Continued)

(58) Field of Classification Search
CPC .. F24F 11/89; F24F 11/74; F24F 11/86; F24F 2140/60; F24F 2140/50; F24F 2110/10;
(Continued)

(56) References Cited

U.S. PATENT DOCUMENTS

2007/0289322 A1\* 12/2007 Mathews ................. F24F 11/77
62/225
2014/0012423 A1\* 1/2014 Li ............................ F24F 11/62
700/276
(Continued)

FOREIGN PATENT DOCUMENTS

| CN | 101881498 A | 11/2010 |
| --- | --- | --- |
| CN | 106288197 A | 1/2017 |

(Continued)

*Primary Examiner* — Kenneth M Lo
*Assistant Examiner* — Tameem D Siddiquee
(74) *Attorney, Agent, or Firm* — The Webb Law Firm

(57) ABSTRACT

The present application provides a control method and device for an air conditioning unit, the method including: obtaining a return air temperature, a condensation temperature, an evaporation temperature, compressor parameters, and fan parameters of the air conditioning unit; determining a preset evaporation temperature according to the return air temperature, the condonation temperature, the evaporation temperature, the compressor parameters, the fan parameters, a compressor power curve, and a fan power curve, wherein the sum of a compressor power and a fan power is minimized at the preset evaporation temperature; determining a preset compressor frequency and a preset fan frequency corresponding to the preset evaporation temperature according to the compressor power curve and the fan power curve;
(Continued)

controlling a compressor according to the preset compressor frequency; and controlling a fan according to the preset fan frequency.

12 Claims, 4 Drawing Sheets

(51) Int. Cl.
- *F24F 11/86* (2018.01)
- *G05B 13/02* (2006.01)
- *F24F 140/60* (2018.01)
- *F24F 140/50* (2018.01)
- *F24F 110/10* (2018.01)

(52) U.S. Cl.
CPC ....... *F24F 2110/10* (2018.01); *F24F 2140/50* (2018.01); *F24F 2140/60* (2018.01)

(58) Field of Classification Search
CPC ........ F24F 11/61; F24F 2140/20; F24F 11/00; G05B 13/024
See application file for complete search history.

(56) References Cited

U.S. PATENT DOCUMENTS

| | | |
|---|---|---|
| 2015/0075766 A1 | 3/2015 | Alston |
| 2015/0204593 A1 | 7/2015 | Luo et al. |
| 2015/0285530 A1* | 10/2015 | Honda .................. F24F 5/0035 62/216 |
| 2019/0024924 A1* | 1/2019 | Wan ......................... F24F 11/70 |
| 2019/0203962 A1 | 7/2019 | Takayama |
| 2019/0242606 A1* | 8/2019 | Chen ......................... F24F 11/74 |
| 2020/0166233 A1* | 5/2020 | Takagi .................. G05B 15/02 |

FOREIGN PATENT DOCUMENTS

| | | |
|---|---|---|
| CN | 106907876 A | 6/2017 |
| CN | 106940075 A | 7/2017 |
| CN | 107120809 A | 9/2017 |
| CN | 107270470 A | 10/2017 |
| CN | 107421078 A | 12/2017 |
| CN | 108397853 A | 8/2018 |
| EP | 1398576 A2 | 3/2004 |
| EP | 2320151 A1 | 5/2011 |
| EP | 2940395 A1 | 11/2015 |
| EP | 3255352 A1 | 12/2017 |
| WO | 2017014559 A1 | 1/2017 |
| WO | 2017208345 A1 | 12/2017 |

* cited by examiner

CONTROL METHOD AND DEVICE FOR CONTROLLING AIR CONDITIONING UNIT, AND AIR CONDITIONING UNIT

CROSS-REFERENCE TO RELATED APPLICATIONS

This application is the United States national phase of International Application No. PCT/CN2018/121247 filed Dec. 14, 2018, and claims priority to Chinese Patent Application No. 201810141010.5, filed Feb. 11, 2018, the disclosures of which are hereby incorporated by reference in their entirety.

BACKGROUND OF THE INVENTION

Field of the Invention

The present invention relates to the field of air conditioning control, and in particular, to a control method and device for an air conditioning unit.

Description of Related Art

Air conditioning units are used in many areas of life and production to regulate the ambient temperature. For example, in the field of rail transit such as subways, water-cooled direct-cooling air conditioning units are often used for cooling.

At present, in order to control the operation of an air conditioning unit effectively, most of the relevant methods are to detect the ambient temperature in the target region and adjust the compressor in the air conditioning unit accordingly according to the detected ambient temperature.

SUMMARY OF THE INVENTION

An embodiment of the present application provides a control method for an air conditioning unit, comprising: obtaining a return air temperature, a condensation temperature, an evaporation temperature, compressor parameters, and fan parameters of the air conditioning unit, wherein the air conditioning unit comprises at least a compressor and a fan; determining a preset evaporation temperature according to the return air temperature, the condensation temperature, the evaporation temperature, the compressor parameters, the fan parameters, a compressor power curve, and a fan power curve, wherein the sum of a compressor power and a fan power is minimized at the preset evaporation temperature; determining a preset compressor frequency and a preset fan frequency corresponding to the preset evaporation temperature according to the compressor power curve and the fan power curve; and controlling the compressor according to the preset compressor frequency, and controlling the fan according to the preset fan frequency.

In some embodiments, the control method for an air conditioning unit further comprises: determining the compressor power curve and the fan power curve according to the return air temperature, the condensation temperature, the evaporation temperature, the compressor parameters, and the fan parameters.

In some embodiments, the determining a preset compressor frequency and a preset fan frequency corresponding to the preset evaporation temperature according to the compressor power curve and the fan power curve comprises: determining the preset compressor frequency and the preset fan frequency respectively according to the preset evaporation temperature, the return air temperature, the condensation temperature, the compressor parameters, and the fan parameters.

In some embodiments, the control method for an air conditioning unit further comprises: detecting whether a user load has changed; and if it is determined that the user load has changed, controlling the fan frequency according to a target temperature and the return air temperature.

In some embodiments, the controlling the fan frequency based on the target temperature and the return air temperature comprises: comparing the return air temperature with the target temperature; if the return air temperature is greater than the target temperature and the fan frequency is lower than an upper limit value of the fan frequency, increasing the fan frequency; and if the return air temperature is lower than the target temperature and the fan frequency is higher than a lower limit value of the fan frequency, reducing the fan frequency.

In some embodiments, if the return air temperature is greater than the target temperature and the fan frequency is equal to the upper limit value of the fan frequency, the compressor frequency is increased; and if the return air temperature is lower than the target temperature and the fan frequency is equal to the lower limit value of the fan frequency, the compressor frequency is decreased.

An embodiment of the present application further provides a control device for an air conditioning unit, comprising: an acquisition module for obtaining a return air temperature, a condensation temperature, an evaporation temperature, compressor parameters, and fan parameters of the air conditioning unit, wherein the air conditioning unit comprises at least a compressor and a fan; a first determination module for determining a preset evaporation temperature according to the return air temperature, the condensation temperature, the evaporation temperature, the compressor parameters, the fan parameters, a compressor power curve, and a fan power curve, wherein the sum of a compressor power and a fan power is minimized at the preset evaporation temperature; a second determination module for determining a preset compressor frequency and a preset fan frequency according to the compressor power curve and the fan power curve; a control module for controlling the compressor according to the preset compressor frequency, and controlling the fan according to the preset fan frequency.

An embodiment of the present application further provides a control device for an air conditioning unit, comprising: a memory; and a processor coupled to the memory, the processor configured to, based on instructions stored in the memory, carry out the control method for an air conditioning unit according to any one of the previous embodiments.

An embodiment of the present application also provides a computer-readable storage medium on which a computer program is stored, which when executed by a processor implement the control method for an air conditioning unit described in any of the foregoing embodiments.

An embodiment of the present application further provides an air conditioning unit, comprising: a compressor and a fan; a temperature sensor configured to detect a return air temperature of the air conditioning unit; a first pressure sensor configured to detect a first pressure, the first pressure being used to determine a condensation temperature of the air conditioning unit; a second pressure sensor configured to detect a second pressure, the second pressure being used to determine a evaporation temperature of the air conditioning unit; and a controller configured to obtain the return air temperature, the condensation temperature, the evaporation temperature, compressor parameters, and fan parameters, determine a preset evaporation temperature according to the return air temperature, the condensation temperature, the evaporation temperature, the compressor parameters, the fan parameters, a compressor power curve, and a fan power curve, wherein the sum of a compressor power and a fan power is minimized at the preset evaporation temperature, determine a preset compressor frequency and a preset fan frequency corresponding to the preset evaporation temperature according to the compressor power curve and the fan power curve, and control the compressor according to the preset compressor frequency, and control the fan according to the preset fan frequency.

An embodiment of the present application provides a control method for an air conditioning unit, comprising: obtaining a return air temperature, a condensation temperature, an evaporation temperature, compressor parameters, and fan parameters of the air conditioning unit, wherein the air conditioning unit comprises at least a compressor and a fan; determining the compressor power curve and the fan power curve according to the return air temperature, the condensation temperature, the evaporation temperature, the compressor parameters, and the fan parameters; determining a preset compressor frequency and a preset fan frequency according to the compressor power curve and the fan power curve; and controlling the compressor according to the preset compressor frequency; controlling the fan according to the preset fan frequency.

In some embodiments, the determining the compressor power curve and the fan power curve according to the return air temperature, the condensation temperature, the evaporation temperature, the compressor parameters, and the fan parameters comprises: according to the return air temperature, the condensation temperature, the evaporation temperature, the compressor parameters, and the fan parameters, establishing a fan air volume model, an evaporation temperature model, a cooling capacity model, and a compressor power model respectively; determining the fan power curve according to the return air temperature, the condensation temperature, the fan air volume model, and the evaporation temperature model; and determining the compressor power curve according to the return air temperature, the condensation temperature, the cooling capacity model, and the compressor power model.

In some embodiments, the compressor parameters comprise a compressor frequency and a compressor power, and the fan parameters comprise a fan frequency and a fan power.

In some embodiments, the cooling capacity model is established according to the following formula:

$$Q = F_y \times (\phi_{c1} + \phi_{c2} \times T_e + \phi_{c3} \times T_C + \phi_{c4} \times T_e^2 + \phi_{c5} \times T_e \times T_C + \phi_{c6} \times T_C^2 + \phi_{c7} \times T_e^3 + \phi_{c8} \times T_C \times T_e^2 + \phi_{c9} \times T_e \times T_C^2 + \phi_{c10} \times T_C^3)$$

wherein, Q is cooling capacity, $F_y$ is compressor frequency, $T_e$ is evaporation temperature, $T_C$ is condensation temperature, and $\phi_{c1}$, $\phi_{c2}$, $\phi_{c3}$, $\phi_{c4}$, $\phi_{c5}$, $\phi_{c6}$, $\phi_{c7}$, $\phi_{c8}$, $\phi_{c9}$, $\phi_{c10}$ are constant coefficients, respectively.

In some embodiments, the compressor power model is established according to the following formula:

$$P_y = F_y \times (p_{c1} + p_{c2} \times T_e + p_{c3} \times T_C + p_{c4} \times T_e^2 + p_{c5} \times T_e \times T_C + p_{c6} \times T_C^2 + p_{c7} \times T_e^3 + p_{c8} \times T_C \times T_e^2 + p_{c9} \times T_e \times T_C^2 + p_{c10} \times T_C^3)$$

wherein, $P_y$ is compressor power, $F_y$ is compressor frequency, $T_e$ is evaporation temperature, $T_C$ is the condensing temperature, and $p_{c1}$, $p_{c2}$, $p_{c3}$, $p_{c4}$, $p_{c5}$, $p_{c6}$, $p_{c7}$, $p_{c8}$, $p_{c9}$, $p_{c10}$ are constant coefficients, respectively.

In some embodiments, determining a preset compressor frequency and a preset fan frequency according to the compressor power curve and the fan power curve comprises: determining a preset evaporation temperature according to the compressor power curve and the fan power curve, wherein the sum of a compressor power and a fan power is minimized at the preset evaporation temperature; and determining the preset compressor frequency and the preset fan frequency respectively according to the preset evaporation temperature, the return air temperature, the condensation temperature, the compressor parameters, and the fan parameters.

In some embodiments, after obtaining the return air temperature, the condensation temperature, the evaporation temperature, the compressor parameters, and the fan parameters of the air conditioning unit, the control method further comprises: detecting whether a user load has changed; acquiring the ambient temperature of a target area when it is determined that the user load has changed; adjusting the fan frequency according to the ambient temperature and the return air temperature; adjusting the compressor frequency according to the adjusted fan frequency; and controlling the fan according to the adjusted fan frequency; controlling the compressor according to the adjusted compressor frequency.

In some embodiments, detecting whether a user load has changed comprises: comparing the values of the return air temperature and the target temperature in a consecutive preset time period; in the consecutive preset time period, determining that the user load has not changed if the value of the return air temperature is equal to the value of the target temperature; and in the consecutive preset time period, determining that the user load has changed if the value of the return air temperature is not equal to the value of the target temperature.

In some embodiments, the adjusting the fan frequency according to the ambient temperature and the return air temperature comprises: comparing the return air temperature with the ambient temperature; increasing the fan frequency if the return air temperature is greater than the ambient temperature; and reducing the fan frequency if the return air temperature is less than or equal to the ambient temperature.

In some embodiments, the adjusting the compressor frequency according to the adjusted fan frequency comprises: comparing the adjusted fan frequency with an upper limit value of the fan frequency and a lower limit value of the fan frequency respectively; increasing the compressor frequency if the adjusted fan frequency is equal to the upper limit of the fan frequency; and decreasing the compressor frequency if the adjusted fan frequency is equal to the lower limit value of the fan frequency.

An embodiment of the present application further provides a control device for an air conditioning unit, comprising: an acquisition module for obtaining a return air temperature, a condensation temperature, an evaporation temperature, compressor parameters, and fan parameters of the air conditioning unit, wherein the air conditioning unit comprises at least a compressor and a fan; a first determination module for determining the compressor power curve and the fan power curve according to the return air temperature, the condensation temperature, the evaporation temperature, the compressor parameters, and the fan parameters; a second determination module for determining a preset compressor frequency and a preset fan frequency according to the compressor power curve and the fan power curve; and a control module for controlling the compressor according to the preset compressor frequency; controlling the fan according to the preset fan frequency.

BRIEF DESCRIPTION OF THE DRAWINGS

The accompanying drawings constituting a part of this application are used to provide a further understanding of the present disclosure. The illustrative embodiments of the present disclosure and their description serve to explain the present disclosure, but are not limitation thereof. In the drawings.

DESCRIPTION OF THE INVENTION

In order to make the object, technical solutions and advantages of the present disclosure more clear, the disclosure will be further described in detail in conjunction with the embodiments and the drawings. Here, the exemplary embodiments of the present disclosure and the description thereof are used to explain the present disclosure, but are not intended to limit the present disclosure.

In the relevant methods, the compressor in an air conditioning unit is often controlled merely based on the collected ambient temperature, without in-depth analysis of the influence of other various operating parameters, nor precise control of other equipment in the air conditioning unit, for example, the fan that has greater influence on the air conditioning unit. Therefore, the control based on relevant methods often fails to reach an optimal operating state of the air conditioning unit as a whole. In summary, when the relevant methods are implemented in practice, there is often a technical problem that the control accuracy of the air conditioning unit is not high, and the control effect is poor. In view of cause of the above technical problem, the specific interaction between various operating parameters of the air conditioning unit can be deeply analyzed in the present application, and precise control of the fan, the compressor and other equipments in the air conditioning unit can be performed respectively based on various operating parameters, so that multiple equipments as a whole in the air conditioning unit can reach an optimal operating state. Therefore, the technical problem of low control accuracy and poor control effect of the air conditioning unit in the related methods can be solved, and a technical effect of precise energy-saving control of the air conditioning unit based on various operating parameters can be achieved.

The embodiments of the present disclosure provide a control method and device for an air conditioning unit to solve the technical problem of low control accuracy and poor control effect of the air conditioning unit in the related methods, achieving a technical effect of precise energy-saving control of the air conditioning unit based on various operating parameters.

Figure 1:
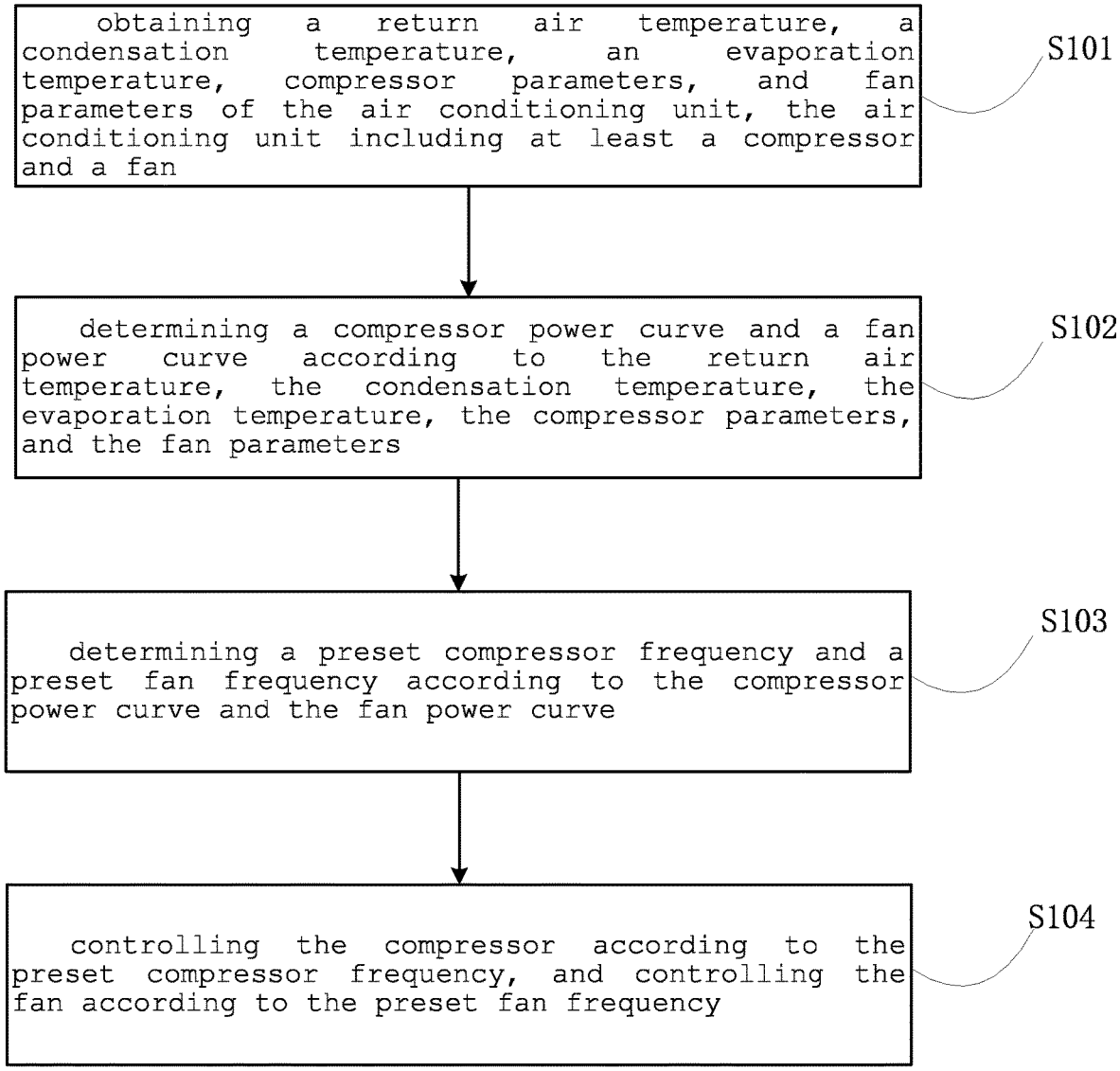
FIG. 1 is a schematic diagram of a processing flow of a control method for an air conditioning unit according to an embodiment of the present disclosure.

According to some embodiments of the present application, a control method for an air conditioning unit is provided. FIG. 1 is a schematic diagram of a processing flow of a control method for an air conditioning unit according to an embodiment of the present disclosure. The method may specifically comprises the following steps, for example, S101, obtaining a return air temperature, a condensation temperature, an evaporation temperature, compressor parameters, and fan parameters of the air conditioning unit, wherein the air conditioning unit comprises at least a compressor and a fan.

In some embodiments, the air conditioning unit may specifically be a water-cooled direct-cooling air conditioning unit. Compared with an air conditioner with a combined water-chiller unit and a modular cabinet, the above water-cooled direct-cooling air conditioner unit has the characteristics of good energy saving effect and easy installation, and its application is getting more and more attention. The above air conditioning unit may be applied in a specific target area such as a shopping mall, a hotel, etc., or in a transportation such as a subway, a train, etc. It should be noted that the air conditioning units and target areas listed above are only for better explanation of the embodiments of the present application. As a specific implementation, other types of air conditioning units than those listed above may also be used according to specific circumstances, and the application scenarios may comprise other target areas than the places and areas listed above, which is not particularly limited in the present application.

In the embodiments, the air conditioning unit comprises at least a compressor (comprising a variable frequency compressor) and a fan (comprising a variable frequency blower). The above compressor can be specifically used to output cooling capacity to a target area to cool the target area. The above fan may be specifically used to supply air to the target area, and affect the temperature and human experience in the target area by adjusting the supplied air volume. In this embodiment, taking into account a fact that the operation of the compressor and fan in the air conditioning unit will have an important impact on the ambient temperature and human experience in the target area, it is proposed to carry out control for the above two equipments simultaneously so that the air conditioning unit as a whole can be in an optimal operating state. The above optimal operating state can be specifically understood as an operating state that satisfies the user's load requirements, has a good human body experience, and consumes minimum energy. Certainly, it should be noted that the compressor and fan listed above are only two specific devices concerned in the embodiment of the present application, and the air conditioning unit also comprises other corresponding devices. Specifically, the above air conditioning unit may further comprise: a water-cooled condenser, an electronic expansion valve, an evaporator such as a direct-expansion fin evaporator, and a sensor system. The above sensor system may specifically comprise: a high-pressure sensor, a low-pressure sensor, an ambient temperature sensor, a return air temperature sensor, a supply air temperature sensor, a cooling water inlet temperature sensor, a cooling water outlet temperature sensor, and so on.

In some embodiments, the compressor parameters may specifically comprise compressor frequency, compressor power, etc., and the fan parameters may specifically comprise fan frequency, fan power, etc.

In some embodiments, obtaining a return air temperature, a condensation temperature, and an evaporation temperature of a target area described above may comprise: determining the return air temperature based on data collected by a return air temperature sensor; determining the condensation temperature based on data collected by a high-pressure sensor; and determining the evaporation temperature based on data collected by a low-pressure sensor. Specifically, in addition to obtaining the above multiple temperature parameters, other temperature parameters can be obtained using one or more of the following methods according to specific circumstances for more elaborate data analysis: collecting a supply air temperature by a supply air temperature sensor; and collecting an ambient temperature in the target area by an ambient temperature sensor.

In some embodiments, obtaining the compressor parameters, fan parameters and other parameters of the air conditioning unit may specifically comprises: activating the air conditioning unit, activating the fan, as the fan frequency rises, using the controller to collect and record a fan frequency value and a fan power value corresponding to the fan frequency after each fan frequency adjustment as fan frequency and fan power values during the operation of the air conditioning unit; keeping the cooling capacity, condensation temperature and return air temperature unchanged, adjusting the supply air volume of the fan, and collecting evaporation temperature values corresponding to different supply air volume values as evaporation temperature values during the operation of the air conditioning unit; testing (obtaining), by the controller, cooling capacity at multiple sets of different compressor frequencies, different evaporation temperatures, and different condensation temperatures to obtain cooling capacity, compressor frequency, and condensation temperature values during the operation of the air conditioning unit; and testing (obtaining), by the controller, the input power of the compressor at multiple sets of different compressor frequencies, different evaporation temperatures, and different condensation temperatures as compressor power values during the operation of the air conditioning unit.

In some embodiments, the control method for an air conditioning unit further comprises: determining a preset evaporation temperature according to the return air temperature, the condensation temperature, the evaporation temperature, the compressor parameters, the fan parameters, a compressor power curve, and a fan power curve, wherein the sum of a compressor power and a fan power is minimized at the preset evaporation temperature.

In other embodiments, before determining the preset evaporation temperature, the control method for an air conditioning unit further comprises: S102, determining the compressor power curve and the fan power curve according to the return air temperature, the condensation temperature, the evaporation temperature, the compressor parameters, and the fan parameters.

In some embodiments, as a specific implementation, determining the compressor power curve and the fan power curve according to the return air temperature, the condensation temperature, the evaporation temperature, the compressor parameters, and the fan parameters may comprise:

S102-1, according to the return air temperature, the condensation temperature, the evaporation temperature, the compressor parameters, and the fan parameters, establishing a fan air volume model, an evaporation temperature model, a cooling capacity model, and a compressor power model respectively;

S102-2, determining the fan power curve according to the return air temperature, the condensation temperature, the fan air volume model, and the evaporation temperature model; and S102-3, determining the compressor power curve according to the return air temperature, the condensation temperature, the cooling capacity model, and the compressor power model.

In some embodiments, in order to establish a fan air volume model, an evaporation temperature model, a cooling capacity model, and a compressor power model, as a specific implementation, relevant data may be extracted from the compressor parameters and the fan parameters in turn; and according to the extracted relevant data, the fan air volume model, the evaporation temperature model, the cooling capacity model, and the compressor power model are established.

In some embodiments, as a specific implementation, fan frequency values and fan power values corresponding to the fan frequency values collected by the controller upon the activation of the air conditioning unit and operation of the fan as the frequency of the fan rises can be extracted from the fan parameters for data analysis to obtain the fan air volume model through data fitting, wherein the fan air volume model described above can be used to characterize the change of the fan air volume with the fan frequency and fan power. Then, calibration is performed by using the actual measured fan frequency values, fan power values, and a fan wind characteristic curve to obtain a calibrated fan air volume model.

In some embodiments, as a specific implementation, the calibrated fan air volume model may be specifically expressed in the following form:

$$q_v = f(F_s, P_s)$$

wherein, $q_v$ specifically represents fan air volume, $F_s$ specifically represents fan frequency, and $P_s$ specifically represents fan power.

In some embodiments, as a specific implementation, collected evaporation temperature values corresponding to different air volumes are extracted from the compressor parameters, the fan parameters and other parameters through adjusting the supply air volume of the fan while keeping the cooling capacity, condensation temperature, and return air temperature unchanged. Data analysis can be performed on the above data based on the calibrated fan air volume model to establish an evaporation temperature model through data fitting. The evaporation temperature model can be specifically used to characterize the change of the evaporation temperature with the supply air volume under the condition that the condensation temperature, the return air temperature and the cooling capacity are fixed.

In some embodiments, as a specific implementation, the evaporation temperature model described above can be specifically expressed in the following form:

$$T_e = f(T_C, Q, T_h, q_v)$$

wherein, $T_e$ specifically represents evaporation temperature, $T_h$ specifically represents return air temperature, $T_C$ specifically represents condensation temperature, Q specifically represents cooling capacity, and $q_v$ specifically represents fan air volume. The above fan air volume can be specifically substituted using the calibrated fan air volume.

In some embodiments, as a specific implementation, cooling capacity values collected at a plurality of sets of different compressor frequencies, different evaporating temperatures, and different condensation temperatures can be extracted from the compressor parameters, the fan parameters, and other parameters. Data analysis can be performed on the above data to establish the cooling capacity model through data fitting in conjunction with the evaporation temperature model. The cooling capacity model can be specifically used to characterize the change of the cooling capacity with the evaporation temperature, the condensation temperature, and the compressor frequency.

In some embodiments, as a specific implementation, the above cooling capacity model may be specifically expressed in the following form:

$$Q=f(T_C,T_e,F_y)$$

wherein, Q specifically represents cooling capacity, $T_C$ specifically represents condensation temperature, $F_y$ specifically represents compressor frequency, and $T_e$ specifically represents evaporation temperature. The above evaporation temperature can be specifically substituted using the evaporation temperature model.

In some embodiments, through data fitting and equation rearrangement, specifically, the cooling capacity model can be established according to the following formula:

$$Q=F_y\times(\phi_{c1}+\phi_{c2}\times T_e+\phi_{c3}\times T_C+\phi_{c4}\times T_e^2+\phi_{c5}\times T_e\times T_C+\phi_{c6}\times T_C^2+\phi_{c7}\times T_e^3+\phi_{c8}\times T_C\times T_e^2+\phi_{c9}\times T_e\times T_C^2+\phi_{c10}\times T_C^3)$$

wherein, Q specifically represents cooling capacity, $F_y$ specifically represents compressor frequency, $T_e$ specifically represents evaporation temperature, $T_C$ specifically represents condensation temperature, and $\phi_{c1}$, $\phi_{c2}$, $\phi_{c3}$, $\phi_{c4}$, $\phi_{c5}$, $\phi_{c6}$, $\phi_{c7}$, $\phi_{c8}$, $\phi_{c9}$, $\phi_{c10}$ can represent constant coefficients, respectively. The above constant coefficients $\phi_{c1}$, $\phi_{c2}$, $\phi_{c3}$, $\phi_{c4}$, $\phi_{c5}$, $\phi_{c6}$, $\phi_{c7}$, $\phi_{c8}$, $\phi_{c9}$, $\phi_{c10}$ can be specifically determined by data fitting according to the compressor parameters, the fan parameters, and other parameters.

In some embodiments, as a specific implementation, the compressor frequency model can also be deduced based on the cooling capacity model, wherein the compressor frequency model can be used to characterize the change of the compressor frequency with the evaporation temperature. Specifically, the above compressor model can be expressed in the following form:

$$F_y=f(T_C,T_e,Q)$$

wherein, Q specifically represents cooling capacity, $T_C$ specifically represents condensation temperature, $F_y$ specifically represents compressor frequency, and $T_e$ specifically represents evaporation temperature. The above evaporation temperature can be specifically substituted using the evaporation temperature model.

In some embodiments, as a specific implementation, input power of the compressor at a plurality of sets of different compressor frequencies, different evaporating temperatures, and different condensation temperatures can be extracted from the compressor parameters. Data analysis can be performed on the above data to establish the compressor power model through data fitting in conjunction with other operation parameter models. The compressor power model can be specifically used to characterize the change of the compressor power (i.e., input power of the compressor) with the evaporation temperature, the condensation temperature, and the compressor frequency.

In some embodiments, the compressor power model described above can be specifically expressed in the following form:

$$P_y=f(T_C,T_e,F_y)$$

wherein, $P_y$ specifically represents compressor power, $T_C$ specifically represents condensation temperature, $F_y$ specifically represents compressor frequency, and T specifically represents evaporation temperature.

In some embodiments, through data fitting and equation rearrangement, the compressor power model can be specifically established according to the following formula:

$$P_y=F_y\times(p_{c1}+p_{c2}\times T_e+p_{c3}\times T_C+p_{c4}\times T_e^2+p_{c5}\times T_e\times T_C+p_{c6}\times T_C^2+p_{c7}\times T_e^3+p_{c8}\times T_C\times T_e^2+p_{c9}\times T_e\times T_C^2+p_{c10}\times T_C^3)$$

wherein, $P_y$ specifically represents compressor power, $F_y$ specifically represents compressor frequency, $T_e$ specifically represents evaporation temperature, $T_C$ specifically represents condensation temperature, and $p_{c1}$, $p_{c2}$, $p_{c3}$, $p_{c4}$, $p_{c5}$, $p_{c6}$, $p_{c7}$, $p_{c8}$, $p_{c9}$, $p_{c10}$ can represent constant coefficients, respectively. The above constant coefficients $p_{c1}$, $p_{c2}$, $p_{c3}$, $p_{c4}$, $p_{c5}$, $p_{c6}$, $p_{c7}$, $p_{c8}$, $p_{c9}$, $p_{c10}$ can be specifically determined by data fitting according to the compressor parameters, the fan parameters, and other parameters.

In some embodiments, a fan power curve can be determined according to the return air temperature, the condensation temperature, the fan air volume model, and the evaporation temperature model, which as a specific implementation may comprise: obtaining the fan power curve through substituting corresponding operation parameters in the specific fan air volume model and the specific evaporation temperature model and through mathematical rearrangement. The above fan power curve can be used to characterize the change of fan power with evaporation temperature under the condition of a stable user load.

In this embodiment, it should be noted that the above user load can specifically be understood as the target cooling capacity requested by the user. If the target cooling capacity required by the user remains unchanged, the user load can be considered stable and unchanged. If the target cooling capacity requested by the user changes, for example, if the user increases the set cooling capacity, the user load is considered unstable and changes accordingly.

In some embodiments, the fan power curve described above can be specifically expressed in the following form: $P_s=f(T_e)$, wherein, $P_s$ specifically represent the fan power, and $T_e$ specifically represent the evaporation temperature.

In some embodiments, a compressor power curve can be determined according to the return air temperature, the condensation temperature, the cooling capacity model, and the compressor power model, which in a specific implementation may comprise: obtaining the compressor power curve through substituting corresponding operation parameters in the specific compressor power model and the specific cooling capacity model and through mathematical rearrangement. The above compressor power curve can be used to characterize the change of compressor power with evaporation temperature under the condition of a stable user load.

In some embodiments, the compressor power curve described above can be specifically expressed in the following form: $P_y=f(T_e)$, wherein, $P_y$ specifically represent the compressor power, and T specifically represent the evaporation temperature.

The control method for an air conditioning unit may further comprise: step S103, determining a preset compressor frequency and a preset fan frequency according to the compressor power curve and the fan power curve.

In some embodiments, the preset compressor frequency and the preset fan frequency correspond to the preset evaporation temperature.

In some embodiments, as a specific implementation, determining a preset compressor frequency and a preset fan frequency according to the compressor power curve and the fan power curve may comprise:

S103-1: determining a preset evaporation temperature according to the compressor power curve and the fan power curve, wherein the sum of a compressor power and a fan power is minimized at the preset evaporation temperature; and S103-2: determining the preset compressor frequency and the preset fan frequency respectively according to the preset evaporation temperature, the return air temperature, the condensation temperature, the compressor parameters, and the fan parameters.

In some embodiments, as a specific implementation, the fan power curve and the compressor power curve described above may be shown in the same curve graph; and a temperature corresponding to a minimum of the sum of the fan power and the compressor power (that is, the total power of the air conditioning unit) is determined from this curve graph as the preset evaporation temperature.

In this embodiment, the above preset evaporation temperature may specifically be considered as an optimal evaporation temperature. At this optimal evaporation temperature, the user load can be satisfied, and the sum of the compressor power and the fan power (that is, the total power of the air conditioning unit) reaches the minimum value. It can be considered that, at the preset evaporation temperature, on the premise of satisfying the user load and a stable user load, the entire air conditioning unit is in the optimal operating state, and has a good energy saving effect.

In some embodiments, as a specific implementation, the above preset evaporation temperature may be substituted into the compressor frequency model or the cooling capacity model, to obtain the preset compressor frequency, that is, the optimal compressor frequency, in conjunction with the specific preset evaporation temperature, the return air temperature, the condensation temperature, the compressor parameters and the fan parameters. The preset evaporation temperature may be substituted into the fan air volume model and the evaporation temperature model, to obtain the preset fan frequency, that is, the optimal fan frequency, in conjunction with the specific preset evaporation temperature, the return air temperature, the condensation temperature, the compressor parameters, and the fan parameters.

The control method for an air conditioning unit may further comprise: step S104, controlling the compressor according to the preset compressor frequency, and controlling the fan according to the preset fan frequency.

In this embodiment, as a specific implementation, the preset compressor frequency may be sent to the compressor by the controller of the air conditioning unit, so that the compressor controls the operation of the compressor according to the preset compression frequency; the preset fan frequency is sent to the fan by the controller of the air conditioning unit, so that the fan controls the operation of the fan according to the preset fan frequency; and thus the entire air conditioning unit can be in an optimal or relatively optimal operating state, that is, when the user load is stable, the energy consumption is reduced and a better energy saving and emission reduction effect is achieved while satisfying the user load and improving the user's human experience.

In the embodiment of the present application, compared with related methods, a compressor power curve and a fan power curve are established by obtaining various operating parameters of the air conditioning unit. A preset compressor frequency and a preset fan frequency are determined based on the compressor power curve and the fan power curve, so that the compressor and fan can be accurately controlled simultaneously to enable the air conditioning unit to reach as a whole a better operating state, thereby solving the technical problem of low accuracy of the control of the air conditioning unit and poor control effect in the relevant methods, and achieving the technical effect of precise energy saving control of the air conditioning unit by synthesizing the mutual influence of various operating parameters.

In some embodiments, it should be noted that the control method for an air conditioning unit provided above is mainly applied in a situation where the user load is stable, that is, there is no change in the user load. If the user load changes, for example, a new user load is set, it is often necessary to adjust the compressor and fan, giving priority to quickly and accurately reaching the new user load required by the user; after the user load is reached, according to the situation where the user load is stable, the compressor and the fan are controlled to operate according to the preset compressor frequency and the preset fan frequency, respectively, so that the air conditioning unit is in an optimal operating state.

In this embodiment, it should be noted that, when the user load changes, the priority of adjusting the air conditioning unit to meet the new user load is higher than the priority of adjusting the air conditioning unit to the optimal operating state when the user load does not change. That is, it can be understood that, when the user load does not change, the controller of the air conditioning unit controls the fan frequency and compressor frequency to make the air conditioning unit in an optimal operating state. When the user load changes, the controller of the air conditioning unit preferentially adjusts the fan and compressor to make the air conditioning unit reach the new user load; after the new user load is reached, that is, after the user load is stable, the fan frequency and the compressor frequency are adjusted respectively to make the air conditioning unit as a whole in an optimal operating state.

In some embodiments, as a specific implementation, in order to apply the control method for an air conditioning unit provided by the embodiments of the present application to the situation where the user load changes, for example, after obtaining the return air temperature, the condensation temperature, the evaporation temperature, the compression parameters and the fan parameters, the method may specifically comprise:

S1: detecting whether a user load has changed;

S2: acquiring the ambient temperature of the target area when it is determined that the user load has changed;

S3: adjusting the fan frequency according to the ambient temperature and the return air temperature;

S4: adjusting the compressor frequency according to the adjusted fan frequency; and S5: controlling the fan according to the adjusted fan frequency; controlling the compressor according to the adjusted compressor frequency.

In some embodiments, the ambient temperature is equal to the return air temperature. In step S3, the fan frequency is controlled according to the return air temperature and the target temperature.

In some embodiments, detecting whether the user load has changed described above may comprise:

S11: comparing the values of the return air temperature and the target temperature in a consecutive preset time period;

S12: in the consecutive preset time period, determining that the user load has not changed if the value of the return air temperature is equal to the value of the target temperature;

S13: in the consecutive preset time period, determining that the user load has changed if the value of the return air temperature is not equal to the value of the target temperature.

In this embodiment, the target temperature can be considered as a specific temperature set by the user according to requirements thereof.

In some embodiments, the length of the preset time period may specifically be 5 to 20 minutes. Certainly, it should be noted that the length of the preset time period above is only for the better illustration of the embodiment of the present application. In a specific implementation, other duration may be specified as the duration of the preset time period according to specific conditions and accuracy requirements, which is not particularly limited in the present application.

In this embodiment, the return air temperature is equal to the target temperature in the consecutive preset time period, which can be considered that the value of the collected return air temperature is continuously equal to the value of the target temperature during the preset time period. In contrast, if the values of the return air temperature and the target temperature are not equal in the consecutive preset time period, it can be considered that there is a difference between values of the collected return air temperature and the target temperature within the preset time period, for example, the return air temperature is higher than the target temperature at a certain point, or the return air temperature is lower than the target temperature during a certain time period.

In some embodiments, in a specific implementation, the adjusting the fan frequency according to the ambient temperature and the return air temperature described above may comprise:

S31: comparing the return air temperature with the ambient temperature;

S32: increasing the fan frequency if the return air temperature is greater than the ambient temperature; and S33: reducing the fan frequency if the return air temperature is less than or equal to the ambient temperature.

In this embodiment, the above ambient temperature may specifically refer to the actual temperature of the target area. If the user load is stable without a change, the return air temperature is usually equal to the ambient temperature. If the user load is unstable and changes, there may be a difference between the values of the return air temperature and the ambient temperature.

In this embodiment, as a specific implementation, when the return air temperature is greater than the ambient temperature, frequency-increasing control can be performed on the fan by increasing the frequency of the fan; and when the return air temperature is less than the ambient temperature, frequency-decreasing control can be performed on the fan by decreasing the frequency of the fan, so that the operation of the fan can be effectively adjusted according to the new user load.

In some embodiments, as a specific implementation, adjusting the compressor frequency according to the adjusted fan frequency may comprise:

S41: comparing the adjusted fan frequency with an upper limit value of the fan frequency and a lower limit value of the fan frequency respectively;

S42: increasing the compressor frequency if the adjusted fan frequency is equal to the upper limit of the fan frequency; and S43: decreasing the compressor frequency if the adjusted fan frequency is equal to the lower limit value of the fan frequency.

In this embodiment, the upper limit value of the fan frequency described above may specifically be considered as the highest operation frequency of the fan; and the lower limit value of the fan frequency may specifically be considered as the lowest operation frequency of the fan.

In this embodiment, as a specific implementation, when the adjusted fan frequency is equal to the upper limit value of the fan frequency, frequency-increasing control can be performed on the compressor by increasing the frequency of the compressor; and when the adjusted fan frequency is equal to the lower limit value of the fan frequency, frequency-decreasing control can be performed on the compressor by decreasing the frequency of the compressor, so that the operation of the compressor can be effectively adjusted according to the new user load.

In some embodiments, the fan frequency is controlled based on the return air temperature and the target temperature. That is, the return air temperature is compared with the target temperature; if the return air temperature is greater than the target temperature and the fan frequency is lower than the upper limit value of the fan frequency, the fan frequency is increased; and if the return air temperature is lower than the target temperature and the fan frequency is higher than the lower limit value of the fan frequency, the fan frequency is reduced.

If the return air temperature is greater than the target temperature and the fan frequency is equal to the upper limit value of the fan frequency, the compressor frequency is increased; if the return air temperature is lower than the target temperature and the fan frequency is equal to the lower limit value of the fan frequency, the compressor frequency is decreased.

In this embodiment, through frequency-increasing or frequency-decreasing control performed on the fan and the compressor respectively based on a variety of operating parameters, the entire air conditioning unit can quickly and accurately reach the user load. After the user load is reached, if the user no longer changes the set user load, the user load can be considered stable. In this case, a fan power curve and a compressor power curve are determined according to a variety of operating parameters. Based on the above two power curves, a preset fan frequency and a preset compressor frequency are determined to control the air conditioning unit as a whole in an optimal operating state to achieve the purpose of improving user experience, reducing energy consumption, and improving energy-saving effect under the premise of satisfying the user load.

It can be known from the above description, in the embodiment of the present application, compared with related methods, a compressor power curve and a fan power curve are established by obtaining various operating parameters of the air conditioning unit.

A preset compressor frequency and a preset fan frequency are determined based on the compressor power curve and the fan power curve, so that the compressor and fan can be accurately controlled simultaneously to enable the air conditioning unit to reach as a whole a better operating state, thereby solving the technical problem of low accuracy of the control of the air conditioning unit and poor control effect in the relevant methods, achieving the technical effect of precise energy saving control of the air conditioning unit by synthesizing the mutual influence of various operating parameters. In addition, in the case of a changed user load, according to the relevant operating parameters, frequency-adjustment can be performed on the compressor and the fan respectively to effectively adjust the return air temperature, quickly meet the user load requirements, and improve the user experience.

Figure 2:
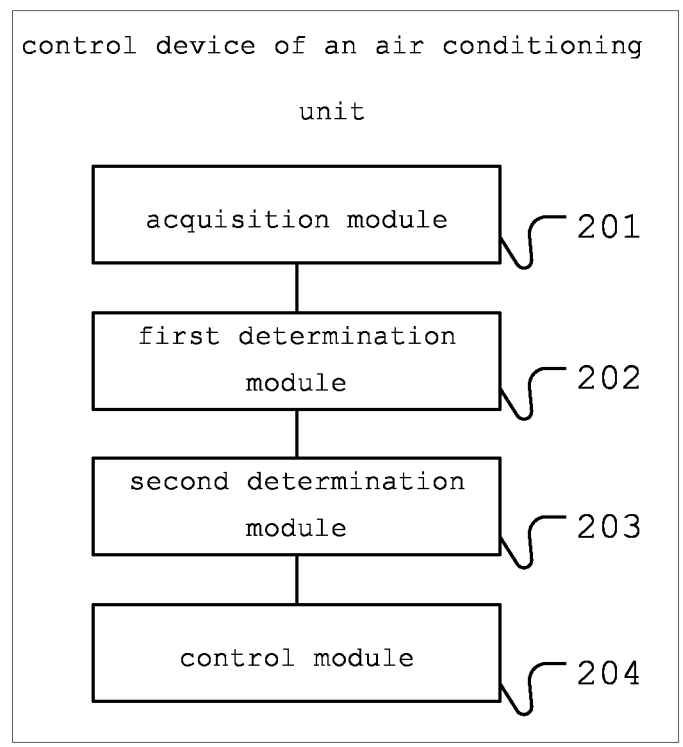
FIG. 2 is a schematic structure diagram of a control device for an air conditioning unit according to an embodiment of the present disclosure.

Based on the same inventive concept, an embodiment of the present application also provides a control device for an air conditioning unit. Referring to FIG. 2, it shows a schematic structure diagram of the composition of the control device for an air conditioning unit according to an embodiment of the present disclosure. The device mainly comprises the following structures: an acquisition module 201, a first determination module 202, a second determination module 203, and a control module 204.

The acquisition module 201 is specifically used for obtaining a return air temperature, a condensation temperature, an evaporation temperature, compressor parameters, and fan parameters of the air conditioning unit, wherein the air conditioning unit comprises at least a compressor and a fan.

In some embodiments, the first determination module 202 is used for determining a preset evaporation temperature according to the return air temperature, the condensation temperature, the evaporation temperature, the compressor parameters, the fan parameters, a compressor power curve, and a fan power curve, wherein the sum of a compressor power and a fan power is minimized at the preset evaporation temperature.

In other embodiments, the first determination module 202 is specifically used for determining the compressor power curve and the fan power curve according to the return air temperature, the condensation temperature, the evaporation temperature, the compressor parameters, and the fan parameters.

The second determination module 203 is used for determining a preset compressor frequency and a preset fan frequency according to the compressor power curve and the fan power curve.

The control module 204 is used for controlling the compressor according to the preset compressor frequency; controlling the fan according to the preset fan frequency.

In some embodiments, in order to determine the compressor power curve and the fan power curve according to the return air temperature, the condensation temperature, the evaporation temperature, the compressor parameters, and the fan parameters, the first determination module 202 may specifically comprises: a model establishment unit for, according to the return air temperature, the condensation temperature, the evaporation temperature, the compressor parameters, and the fan parameters, establishing a fan air volume model, an evaporation temperature model, a cooling capacity model, and a compressor power model respectively; a first determination unit for determining the fan power curve according to the return air temperature, the condensation temperature, the fan air volume model, and the evaporation temperature model; and a second determination unit for determining the compressor power curve according to the return air temperature, the condensation temperature, the cooling capacity model, and the compressor power model.

In some embodiments, the compressor parameters may specifically comprise compressor frequency, compressor power, etc., and the fan parameters may specifically comprise fan frequency, fan power, etc.

In some embodiments, in a specific implementation, the second determination unit establishes the cooling capacity model according to the following formula:

$$Q = F_y \times (\phi_{c1} + \phi_{c2} \times T_e + \phi_{c3} \times T_C + \phi_{c4} \times T_e^2 + \phi_{c5} \times T_e \times T_C + \phi_{c6} \times T_C^2 + \phi_{c7} \times T_e^3 + \phi_{c8} \times T_C \times T_e^2 + \phi_{c9} \times T_e \times T_C^2 + \phi_{c10} \times T_C^3)$$

wherein, Q specifically represents cooling capacity, $F_y$ specifically represents compressor frequency, $T_e$ specifically represents evaporation temperature, $T_C$ specifically represents condensation temperature, and $\phi_{c1}$, $\phi_{c2}$, $\phi_{c3}$, $\phi_{c4}$, $\phi_{c5}$, $\phi_{c6}$, $\phi_{c7}$, $\phi_{c8}$, $\phi_{c9}$, $\phi_{c10}$ can represent constant coefficients, respectively. The above constant coefficients can be specifically determined by data fitting according to the compressor parameters, the fan parameters, and other parameters.

In some embodiments, in a specific implementation, the second determination unit can establish the compressor power model according to the following formula:

$$P_y = F_y \times (p_{c1} + p_{c2} \times T_e + p_{c3} \times T_C + p_{c4} \times T_e^2 + p_{c5} \times T_e \times T_C + p_{c6} \times T_C^2 + p_{c7} \times T_e^3 + p_{c8} \times T_C \times T_e^2 + p_{c9} \times T_e \times T_C^2 + p_{c10} \times T_C^3)$$

wherein, $P_y$ specifically represents compressor power, $F_y$ specifically represents compressor frequency, $T_e$ specifically represents evaporation temperature, $T_C$ specifically represents condensation temperature, and $p_{c1}$, $p_{c2}$, $p_{c3}$, $p_{c4}$, $p_{c5}$, $p_{c6}$, $p_{c7}$, $p_{c8}$, $p_{c9}$, $p_{c10}$ can represent constant coefficients, respectively. The above constant coefficients can be specifically determined by data fitting according to the compressor parameters, the fan parameters, and other parameters.

In some embodiments, in order to determine the preset compressor frequency and the preset fan frequency according to the compressor power curve and the fan power curve, the second determination module 203 may specifically comprise:

a third determination unit for determining a preset evaporation temperature according to the compressor power curve and the fan power curve, wherein the sum of a compressor power and a fan power is minimized at the preset evaporation temperature; and a fourth determination unit for determining the preset compressor frequency and the preset fan frequency respectively according to the preset evaporation temperature, the return air temperature, the condensation temperature, the compressor parameters, and the fan parameters.

In some embodiments, in order to be able to simultaneously handle the control of the air conditioning unit in the case where the user load changes and in the case where the user load does not change, the control device for an air conditioning unit may specifically comprise:

a detection unit for specifically detecting whether a user load has changed;

an acquisition unit for specifically acquiring the ambient temperature of a target area when it is determined that the user load has changed;

a first adjustment unit for specifically adjusting the fan frequency according to the ambient temperature and the return air temperature; a second adjustment unit for specifically adjusting the compressor frequency according to the adjusted fan frequency; and a control unit for specifically controlling the fan according to the adjusted fan frequency; controlling the compressor according to the adjusted compressor frequency.

In some embodiments, a specific implementation for the detection unit may be executed in the following process: comparing the values of the return air temperature and the target temperature in a consecutive preset time period; in the consecutive preset time period, determining that the user load has not changed if the value of the return air temperature is equal to the value of the target temperature; and in the consecutive preset time period, determining that the user load has changed if the value of the return air temperature is not equal to the value of the target temperature. The length of the preset time period may specifically be 5 minutes to 20 minutes. Certainly, it should be noted that the length of the preset time period above is only for the better illustration of the embodiment of the present application. In a specific implementation, the specific duration of the above preset time period can be adjusted according to specific conditions and accuracy requirements, which is not particularly limited in the present application.

In some embodiments, a specific implementation for the first adjustment unit may be executed in the following process: comparing the return air temperature with the ambient temperature; increasing the fan frequency if the return air temperature is greater than the ambient temperature; and reducing the fan frequency if the return air temperature is less than or equal to the ambient temperature.

In some embodiments, a specific implementation for the second adjustment unit may be executed in the following process: comparing the adjusted fan frequency with an upper limit value of the fan frequency and a lower limit value of the fan frequency respectively; increasing the compressor frequency if the adjusted fan frequency is equal to the upper limit of the fan frequency; and decreasing the compressor frequency if the adjusted fan frequency is equal to the lower limit value of the fan frequency.

It can be known from the above description, compared with related devices, in the control device for an air conditioning unit provided in the embodiment of the present application, the acquisition module acquires a plurality of operating parameters of the air conditioning unit; the first determination module establishes a compressor power curve and a fan power curve; the second determination module determines a preset compressor frequency and a preset fan frequency based on the compressor power curve and the fan power curve, so that the control module can accurately control the compressor and the fan simultaneously to enable the air conditioning unit to reach as a whole a better operating state, thereby solving the technical problem of low accuracy of the control of the air conditioning unit and poor control effect in the relevant methods, and achieving the technical effect of precise energy saving control of the air conditioning unit by synthesizing the mutual influence of various operating parameters. In addition, in the case of a changed user load, according to the relevant operating parameters, frequency-adjustment can be performed on the compressor and the fan respectively to effectively adjust the return air temperature, quickly meet the user load requirements, and improve the user experience.

Figure 3:
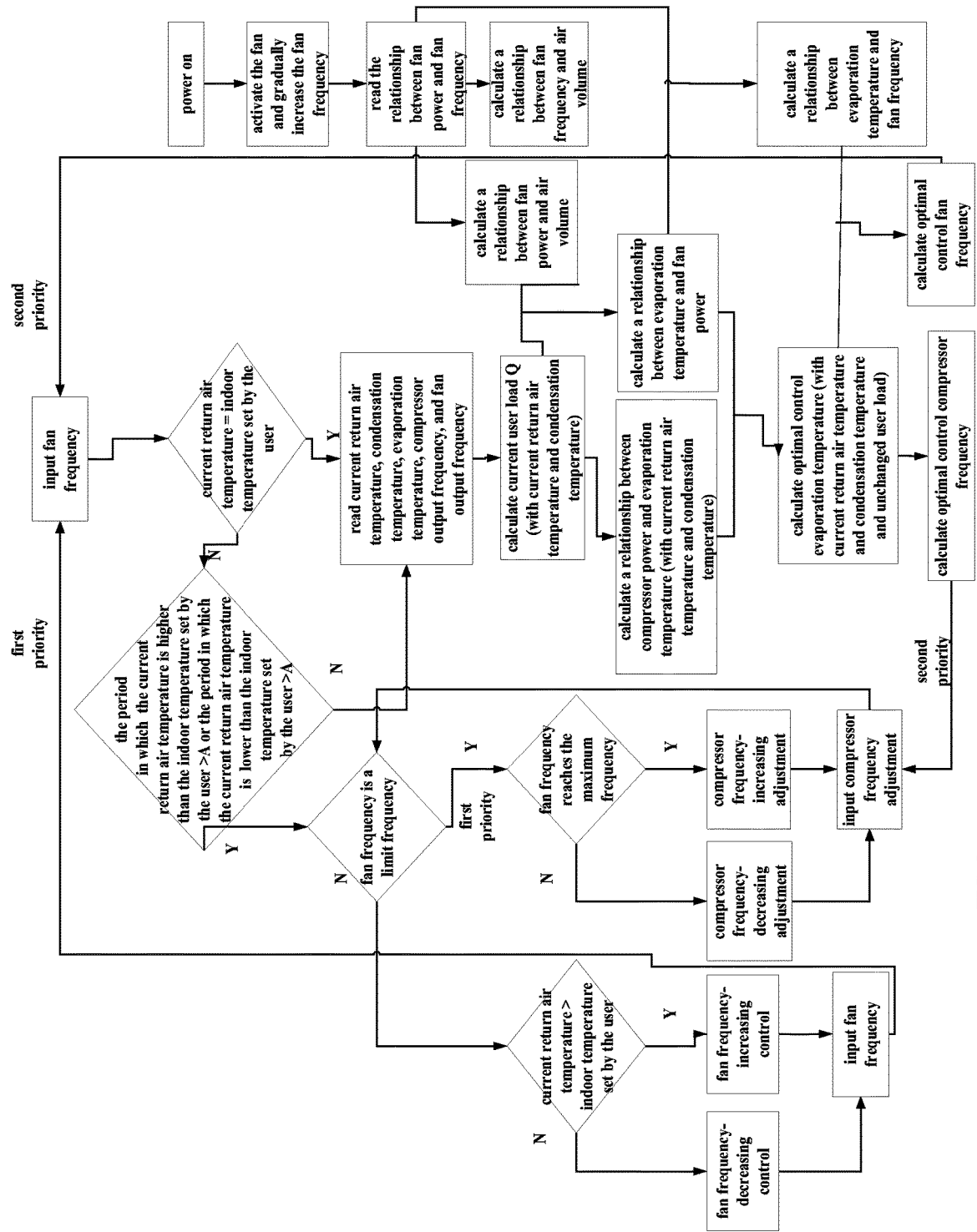
FIG. 3 is a schematic flowchart of energy-saving control of a water-cooled direct-cooling air conditioning unit in a subway using the control method and device for an air conditioning unit provided in the embodiments of the present application.

In a specific application scenario, the control method and device for an air conditioning unit provided in the embodiments of the present application are used to automatically optimize the energy-saving control of a water-cooled direct-cooling air conditioning unit in a subway. In a specific implementation, referring to FIG. 3, which is a schematic flow chart of energy-saving control of a water-cooled direct-cooling air conditioning unit in a subway using the control method and device for an air conditioning unit provided in the embodiments of the present application, the following steps are comprised.

I. When the user load is stable (that is, there is no change in the user load), the frequency of the compressor and the frequency of the air blower (that is, the fan) are adjusted to achieve the energy saving effect. In a specific implementation, it comprises the following steps, for example, S10, calculating fan air volume values corresponding to fan frequency values (i.e., establishing a fan air volume model).

In this embodiment, as a specific implementation, the air supply (frequency conversion) fan is activated every time the air conditioning unit is powered on. As the fan frequency gradually increases, the controller records each adjusted fan frequency and fan power corresponding at the fan frequency. By comparing with the actual test fan frequencies, air volume values and a power characteristic curve embedded in a controller program, the controller can automatically calculate corresponding fan air volume values at different fan frequencies. The following relationship (i.e., a fan air volume model) can be obtained through formula rearrangement: $q_v=f(F_s,P_s)$ (1.1), wherein, $q_v$ specifically represents fan air volume, $F_s$ specifically represents fan frequency, and $P_s$ specifically represents fan power.

Adjusting the frequency of the compressor and the frequency of the fan may further comprise: S20, calculating evaporation temperatures corresponding to fan air volume values (i.e., establishing an evaporation temperature model).

In this embodiment, as a specific implementation, experimental test can be conducted for corresponding evaporation temperatures by adjusting different supply air volumes (i.e., fan air volume) under the same compressor cooling capacity, the same condensation temperature and the same return air temperature. By analyzing the multiple sets of data obtained by the test, the relationship between the evaporation temperature and the supply air volume is fitted (that is, an evaporation temperature model). The model can be specifically represented as follows: $T_e=f(T_C,Q,T_h,q_v)$ (2.1) wherein, Q specifically represents cooling capacity, $T_C$ specifically represents condensation temperature, $F_y$ specifically represents compressor frequency, $T_e$ specifically represents evaporation temperature. The above fitted relationship can be written into a controller program for subsequent use.

Adjusting the frequency of the compressor and the frequency of the fan may further comprise: S3, calculating the compressor output cooling capacity (that is, establishing a cooling capacity model).

In this embodiment, as a specific implementation, an experimental test may be conducted for the compressor cooling capacity at multiple sets of different compressor frequencies, evaporation temperatures, and condensation temperatures. Then according to multiple sets of data obtained through the test, a relational expression of the compressor output cooling capacity is fitted (that is, a cooling capacity model). The model can be specifically represented as follows: $Q=f(T_C,T_e,F_y)$ (3.1).

Specifically, the above fitted relational expression can be further organized into the following form:

$$Q=F_y \times (\phi_{c1}+\phi_{c2} \times T_e+\phi_{c3} \times T_C+\phi_{c4} \times T_e^2+\phi_{c5} \times T_e \times T_C+ \phi_{c6} \times T_C^2+\phi_{c7} \times T_e^3+\phi_{c8} \times T_C \times T_e^2+\phi_{c9} \times T_e \times T_C^2+ \phi_{c10} \times T_C^3)$$

wherein, Q specifically represents cooling capacity, $F_y$ specifically represents compressor frequency, $T_C$ specifically represents evaporation temperature, $T_e$ specifically represents condensation temperature, and $\phi_{c1}$, $\phi_{c2}$, $\phi_{c3}$, $\phi_{c4}$, $\phi_{c5}$, $\phi_{c6}$, $\phi_{c7}$, $\phi_{c8}$, $\phi_{c9}$, $\phi_{c10}$ can represent constant coefficients, respectively.

Under the condition that the cooling capacity output by the compressor is constant, the relationship between compressor frequency and evaporation temperature (i.e., a compressor frequency model) can be further deduced from Equation 3.1: $F_y*f(T_C,T_e,Q)$(3.2), wherein, Q specifically represents cooling capacity, $T_C$ specifically represents condensation temperature, $F_y$ specifically represents compressor frequency, and $T_e$ specifically represents evaporation temperature.

Adjusting the frequency of the compressor and the frequency of the fan may further comprise: S4, calculating the compressor input power (that is, establishing a compressor power model).

In this embodiment, as a specific implementation, an experimental test may be conducted for the compressor input power at multiple sets of different compressor frequencies, evaporation temperatures, and condensation temperatures. According to the multiple sets of data obtained through the test, a relational expression of the compressor input power is fitted (i.e., a compressor power model), which can be expressed as $P_y=f(T_C,T_e,F_y)$ (4.1), wherein $P_y$ specifically represents the compressor power, $T_C$ specifically represents condensation temperature, $F_y$ specifically represents compressor frequency, and $T_e$ specifically represents evaporation temperature.

Specifically, the above fitted relational expression can be further organized into the following form:

$$P_y=F_y\times(p_{c1}+p_{c2}\times T_e+p_{c3}\times T_C+p_{c4}\times T_e^2+p_{c5}\times T_e\times T_C+p_{c6}\times T_C^2+p_{c7}\times T_e^3+p_{c8}\times T_C\times T_e^2+p_{c9}\times T_e\times T_C^2+p_{c10}\times T_C^3)$$

wherein, $P_y$ specifically represents compressor power, $F_y$ specifically represents compressor frequency, $T_e$ specifically represents evaporation temperature, $T_C$ specifically represents condensation temperature, and $p_{c1}$, $p_{c2}$, $p_{c3}$, $p_{c4}$, $p_{c5}$, $p_{c6}$, $p_{c7}$, $p_{c8}$, $p_{c9}$ $p_{c10}$ can represent constant coefficients, respectively.

Adjusting the frequency of the compressor and the frequency of the fan may further comprise: S5, if the user load is constant (that is, there is no change in the user load), calculating an optimal compressor operating frequency, that is, a preset compressor frequency.

In this embodiment, when the operation is stable, the controller can automatically calculate the compressor output cooling capacity based on the currently detected evaporation temperature, condensation temperature, and compressor output frequency (i.e., compressor power). This cooling capacity is the user load.

Figure 4:
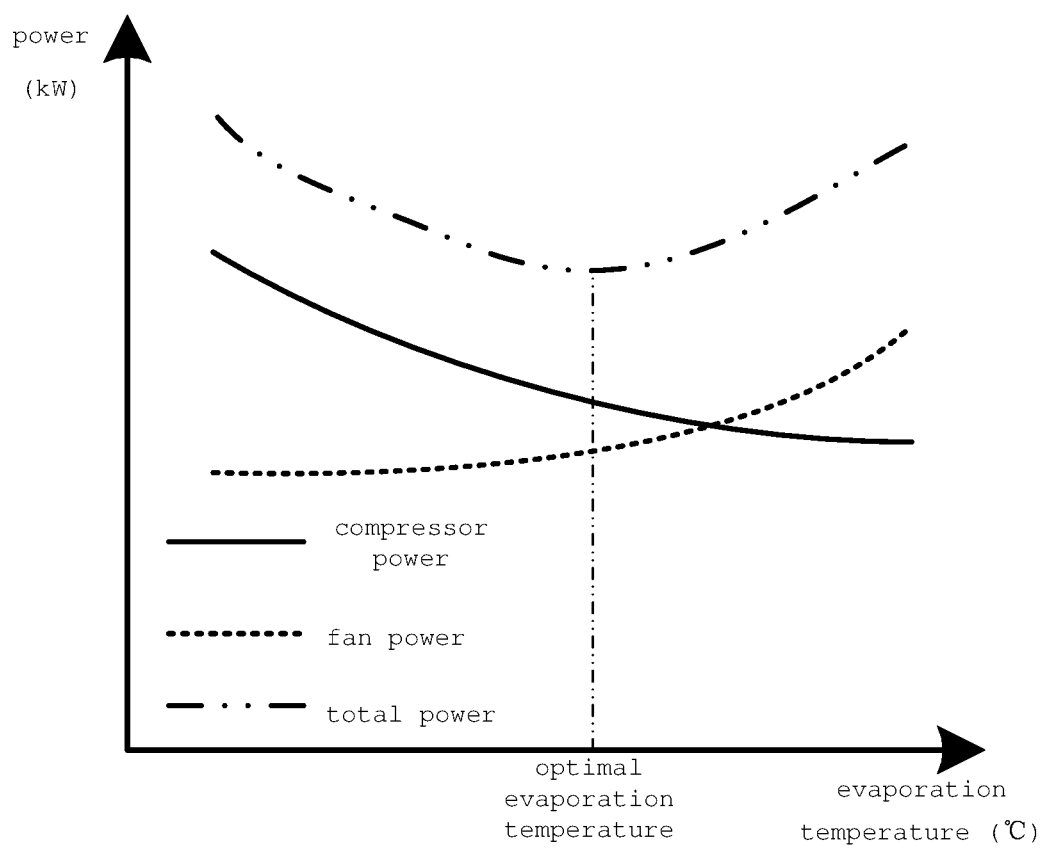
FIG. 4 is a schematic view of a fan power curve, a compressor power curve, and an overall power curve in energy-saving control of a water-cooled direct-cooling air conditioning unit in a subway obtained by using the control method and device for an air conditioning unit provided in the embodiments of the present application.

If the room temperature is remained constant, that is, the return air temperature is constant, and the user's demand load is constant, the condensation temperature of the air conditioning unit is almost unchanged. The controller can calculate the relationship between fan power and evaporation temperature according to the above formulas 1.1 and 2.1, and form a corresponding data table 1, which is then plotted as an evaporation temperature/fan power curve (i.e. a fan power curve) as shown by the dotted line of the system. According to the above formula 3.2 and formula 4.1, the controller calculates the relationship between compressor power and evaporation temperature under the same compressor output cooling capacity, and forms a corresponding data table 2, which is then plotted as an evaporation temperature/compressor power curve (i.e. a compressor power curve) as shown by the dotted line of the system. Referring to FIG. 4, which is a schematic view of obtaining a fan power curve, a compressor power curve, and an overall power curve in energy-saving control of a water-cooled direct-cooling air conditioning unit in a subway using the control method and device for an air conditioning unit provided in the embodiments of the present application.

According to data tables 1 and 2, data table 3, that is, a data table of total power and evaporation temperature of the machine is listed with the same indoor ambient temperature, the same compressor output cooling capacity, and the same condensation temperature. The controller finds out the smallest sum of the total power of the machine, i.e., the evaporation temperature T corresponding to $P_s+P_y$. The evaporation temperature is the optimal evaporation temperature (i.e. the preset evaporation temperature).

Then according to formula 3.2, the controller calculates a corresponding compressor frequency at the optimal evaporation temperature (i.e. the preset compressor frequency); and output the calculated compressor frequency to the compressor to control the compressor.

TABLE 1 indoor ambient temperature XXX ° C., compressor output cooling capacity Xkw, condensation temperature XX ° C.

| fan power | Ps(1) | Ps(2) | . . . | Ps(n) |
|---|---|---|---|---|
| evaporation temperature | Te(1) | Te(2) | . . . | Te(n) |

TABLE 2 indoor ambient temperature XXX ° C., compressor output cooling capacity Xkw, condensation temperature XX ° C.

| compressor power | Py(1) | Py(2) | . . . | Py(n) |
|---|---|---|---|---|
| evaporation temperature | Te(1) | Te(2) | . . . | Te(n) |

TABLE 3 indoor ambient temperature XXX ° C., compressor output cooling capacity Xkw, condensation temperature XX ° C.

| total power | Py(1) + Ps(1) | Py(2) + Ps(2) | . . . | Py(n) + Ps(n) |
|---|---|---|---|---|
| evaporation temperature | Te(1) | Te(2) | . . . | Te(n) |

Adjusting the frequency of the compressor and the frequency of the fan may further comprise: S6, calculating the optimal fan operating frequency (i.e., the preset fan frequency) when the user load is constant.

In this embodiment, as a specific implementation, the controller can calculate the optimal fan frequency (that is, the preset fan frequency) according to the detected optimal evaporation temperature based on formulas 1.1 and 2.1, and input the frequency to the fan for fan control.

In this embodiment, it should be noted that, through the above control, it is possible to find the most energy-saving fan control frequency point and compressor control frequency point under the condition of ensuring the user's load demand, thereby realizing operation energy saving of the machine as a whole.

II. When the user load changes, the compressor frequency and the blower fan frequency are adjusted to meet the user's needs quickly and accurately.

In this embodiment, as a specific implementation, whether the user load changes can be detected as follows.

When the detected return air temperature in a continuous period A (that is, a preset time period) is not equal to the target set temperature (that is, the target temperature), it can be determined that the user load has changed. The following control is based on the control when the load changes. The period A can generally be set to 5-20 minutes.

In this embodiment, it should be noted that the priority of the compressor frequency adjustment in the case of a changed user load is higher than that of the compressor frequency adjustment in the case of a stable user load. Similarly, the priority of the fan frequency adjustment in the case of a changed user load is higher than that of the fan frequency adjustment in the case of a stable user load.

After determining that the user (load) has changed, the following steps can be performed:

S7: after the user load changes, calculating the fan frequency, wherein 1) frequency-increasing control of the fan is performed under the condition that return air temperature>target indoor temperature (that is, ambient temperature), and 2) frequency-decreasing control of the fan is performed under the condition that return air temperature≤target indoor temperature.

S8: after the user load changes, calculating the compressor frequency, wherein 1) frequency-increasing control for the compressor is performed when the detected fan frequency is the highest operation frequency of the fan (i.e. the upper limit of the fan frequency), and 2) frequency-decreasing control for the compressor is performed when the detected fan frequency is the lowest operation frequency of the fan (the lower limit of the fan frequency).

In this embodiment, it should be noted that, through the above control, when the user load changes, the return air temperature can be accurately controlled to meet the user load demand and reach the user load. When the user load is stable, control can be performed for a stable load, in which the air conditioning unit will automatically find the optimal compressor control frequency and fan control frequency, so as to achieve energy saving for the operation of the air conditioning unit as a whole.

In the above application scenarios, it is verified that a plurality of operating parameters of the air conditioning unit are acquired by applying the control method and device for an air conditioning unit provided in the embodiments of the present application; a compressor power curve and a fan power curve are established; a preset compressor frequency and a preset fan frequency are determined based on the compressor power curve and the fan power curve, so that the compressor and fan can be accurately controlled simultaneously to enable the air conditioning unit to reach as a whole a better operating state, thereby solving the technical problem of low accuracy of the control of the air conditioning unit and poor control effect in the relevant methods, and achieving the technical effect of precise energy saving control of the air conditioning unit by synthesizing the mutual influence of various operating parameters.

Software is also provided in some other embodiments, which is used to execute the technical solutions described in the above embodiments and preferred implementations.

In some other embodiments, a storage medium is further provided. The storage medium stores the foregoing software, and comprises but is not limited to CD, floppy, hard disk, rewritable memory, etc.

Obviously, those skilled in the art should understand that the modules or steps of the embodiments of the present disclosure described above can be implemented by a general-purpose computing device, and they can be integrated on a single computing device or distributed on a network of multiple computing devices. In some embodiments, they can be implemented with program code executable by a computing device, so that they can be stored in the storage device and executed by the computing device. In some cases, the steps shown or described can be performed in a different order, or can be made into integrated circuit modules respectively, or multiple modules or steps can be made into a single integrated circuit module. In this way, the embodiments of the present disclosure are not limited to any specific combination of hardware and software.

The above description is only preferred embodiments of the present disclosure and is not intended to limit the present disclosure. For those skilled in the art, the present disclosure may have various modifications and changes. Any modifications, equivalent replacements, or improvements made within the spirit and principle of the present disclosure shall be comprised in the scope of the present disclosure.

What is claimed is:

1. A control method for an air conditioning unit, comprising:
obtaining a return air temperature, a condensation temperature, an evaporation temperature, compressor parameters, and fan parameters of the air conditioning unit, wherein the air conditioning unit comprises at least a compressor and a fan;
establishing a cooling capacity model according to the condensation temperature, the evaporation temperature, and the compressor frequency;
establishing a compressor power model according to the condensation temperature, the evaporation temperature, the compressor frequency and the compressor power;
establishing a fan air volume model according to the fan frequency and the fan power;
establishing evaporation temperature model according to the evaporation temperature and the fan parameters;
determining a fan power curve according to the return air temperature, the condensation temperature, the fan air volume model, and the evaporation temperature model;
determining a compressor power curve according to the return air temperature, the condensation temperature, the cooling capacity model, and the compressor power model;
determining a preset evaporation temperature according to the return air temperature, the condensation temperature, the evaporation temperature, the compressor parameters, the fan parameters, the compressor power curve, and the fan power curve, wherein the sum of the compressor power and the fan power is minimized at the preset evaporation temperature;
determining a preset compressor frequency and a preset fan frequency corresponding to the preset evaporation temperature according to the compressor power curve and the fan power curve; and
controlling the fan according to the preset fan frequency.

2. The control method for an air conditioning unit according to claim 1, wherein the cooling capacity model is established according to the following formula:

$$Q=F_y \times (\phi_{c1}+\phi_{c2} \times T_e+\phi_{c3} \times T_C+\phi_{c4} \times T_e^2+\phi_{c5} \times T_e \times T_C+\phi_{c6} \times T_C^2+\phi_{c7} \times T_e^3+\phi_{c8} \times T_C \times T_e^2+\phi_{c9} \times T_e \times T_C^2+\phi_{c10} \times T_c^3)$$

wherein, Q is cooling capacity, $F_y$ is compressor frequency, $T_e$ is evaporation temperature, $T_c$ is condensation temperature, and $\phi_{c1}$, $\phi_{c2}$, $\phi_{c3}$, $\phi_{c4}$, $\phi_{c5}$, $\phi_{c6}$, $\phi_{c7}$, $\phi_{c8}$, $\phi_{c8}$, $\phi_{c10}$ are constant coefficients determined by data fitting according to the compressor parameters, and the fan parameters.

3. The control method for an air conditioning unit according to claim 1, wherein the compressor power model is established according to the following formula:

$$P_y=F_y \times (p_{c1}+p_{c2} \times T_e+p_{c3} \times T_C+p_{c4} \times T_e^2+p_{c5} \times T_e \times T_C+p_{c6} \times T_C^2+p_{c7} \times T_e^3+p_{c8} \times T_C \times T_e^2+p_{c9} \times T_e \times T_C^2+p_{c10} \times T_c^3)$$

wherein, $P_y$ is compressor power, $F_y$ is compressor frequency, $T_e$ is evaporation temperature, $T_c$ is condensation temperature, and $p_{c1}$, $p_{c2}$, $p_{c3}$, $p_{c4}$, $p_{c5}$, $p_{c6}$, $p_{c7}$, $p_{c8}$, $p_{c9}$, $p_{c10}$ are constant coefficients determined by data fitting according to the compressor parameters, and the fan parameters.

4. The control method for an air conditioning unit according to claim 1, wherein the determining the preset compressor frequency and the preset fan frequency corresponding to the preset evaporation temperature according to the compressor power curve and the fan power curve comprises:
determining the preset compressor frequency and the preset fan frequency respectively according to the preset evaporation temperature, the return air temperature, the condensation temperature, the compressor parameters, and the fan parameters.

5. The control method for an air conditioning unit according to claim 1, further comprising:
detecting whether a user load has changed; and
controlling the fan frequency according to a target temperature and the return air temperature if it is determined that the user load has changed.

6. The control method for an air conditioning unit according to claim 5, wherein the detecting whether a user load has changed comprises:
comparing values of the return air temperature and the target temperature in a consecutive preset time period;
determining that the user load has not changed if the value of the return air temperature is equal to the value of the target temperature in the consecutive preset time period;
determining that the user load has changed if the value of the return air temperature is not equal to the value of the target temperature in the consecutive preset time period.

7. The control method for an air conditioning unit according to claim 5, wherein the controlling the fan frequency based on the target temperature and the return air temperature comprises:
comparing the return air temperature with the target temperature;
if the return air temperature is greater than the target temperature and the fan frequency is lower than an upper limit value of the fan frequency, increasing the fan frequency; and
if the return air temperature is lower than the target temperature and the fan frequency is higher than a lower limit value of the fan frequency, reducing the fan frequency.

8. The control method for an air conditioning unit according to claim 7, wherein:
if the return air temperature is greater than the target temperature and the fan frequency is equal to the upper limit value of the fan frequency, the compressor frequency is increased; and
if the return air temperature is lower than the target temperature and the fan frequency is equal to the lower limit value of the fan frequency, the compressor frequency is decreased.

9. A control device for an air conditioning unit, comprising:
an acquisition module for obtaining a return air temperature, a condensation temperature, an evaporation temperature, compressor parameters, and fan parameters of the air conditioning unit, wherein the air conditioning unit comprises at least a compressor and a fan, and the compressor parameters comprise a compressor frequency and a compressor power;
an establishing module for establishing a cooling capacity model according to the condensation temperature, the evaporation temperature, and the compressor frequency, establishing a compressor power model according to the condensation temperature, the evaporation temperature, the compressor frequency and the compressor power, establishing a fan air volume model according to the fan frequency and the fan power, and establishing evaporation temperature model according to the evaporation temperature and the fan parameters;
a curve determination module for determining a fan power curve according to the return air temperature, the condensation temperature, the fan air volume model, and the evaporation temperature model, and determining a compressor power curve according to the return air temperature, the condensation temperature, the cooling capacity model, and the compressor power model;
a first determination module for determining a preset evaporation temperature according to the return air temperature, the condensation temperature, the evaporation temperature, the compressor parameters, the fan parameters, the compressor power curve, and the fan power curve, wherein the sum of the compressor power and the fan power is minimized at the preset evaporation temperature;
a second determination module for determining a preset compressor frequency and a preset fan frequency according to the compressor power curve and the fan power curve; and
a control module for controlling the compressor according to the preset compressor frequency, and controlling the fan according to the preset fan frequency.

10. A control device for an air conditioning unit, comprising:
a memory; and
a processor coupled to the memory, the processor configured to, based on instructions stored in the memory, implement the control method for an air conditioning unit according to claim 1.

11. A computer-readable storage medium on which a computer program is stored, which when executed by a processor implements the control method for an air conditioning unit according to claim 1.

12. An air conditioning unit, comprising:
a compressor and a fan;
a temperature sensor configured to detect a return air temperature of the air conditioning unit;
a first pressure sensor configured to detect a first pressure for determining a condensation temperature of the air conditioning unit;
a second pressure sensor configured to detect a second pressure for determining an evaporation temperature of the air conditioning unit; and
a controller configured to
obtain the return air temperature, the condensation temperature, the evaporation temperature, compressor parameters, and fan parameters, wherein the compressor parameters comprise a compressor frequency and a compressor power, and the fan parameters comprise a fan frequency and a fan power,
establish a cooling capacity model according to the condensation temperature, the evaporation temperature, and the compressor frequency, establish a compressor power model according to the condensation temperature, the evaporation temperature, the compressor frequency and the compressor power, establish a fan air volume model according to the fan frequency and the fan power, establish evaporation temperature model according to the evaporation temperature and the fan parameters, determine a fan power curve according to the return air temperature, the condensation temperature, the fan air volume model, and the evaporation temperature model, determine a compressor power curve according to the return air temperature, the condensation temperature, the cooling capacity model, and the compressor power model, determine a preset evaporation temperature according to the return air temperature, the condensation temperature, the evaporation temperature, the compressor parameters, the fan parameters, a compressor power curve, and a fan power curve, wherein a sum of a compressor power and a fan power is minimized at the preset evaporation temperature, determine a preset compressor frequency and a preset fan frequency corresponding to the preset evaporation temperature according to the compressor power curve and the fan power curve, and control the compressor according to the preset compressor frequency, and control the fan according to the preset fan frequency.

* * * * *

UNITED STATES PATENT AND TRADEMARK OFFICE
CERTIFICATE OF CORRECTION

PATENT NO. : 11,408,634 B2
APPLICATION NO. : 16/961728
DATED : August 9, 2022
INVENTOR(S) : Hua Liu et al.

It is certified that error appears in the above-identified patent and that said Letters Patent is hereby corrected as shown below:

On the Title Page

Column 2, Abstract, Line 7, delete "condonation" and insert -- condensation --

In the Claims

Column 22, Line 48, Claim 1, before "controlling" insert -- controlling the compressor according to the preset compressor frequency, and --

Column 22, Line 56, Claim 2, delete "0" and insert -- Q --

Column 22, Line 59, Claim 2, delete "$\phi_{c8}$," and insert -- $\phi_{c9}$, --

Signed and Sealed this
Fourth Day of October, 2022

Katherine Kelly Vidal
*Director of the United States Patent and Trademark Office*